No. 666,831. Patented Jan. 29, 1901.
J. T. WATSON.
DEVICE FOR INDICATING DISARRANGEMENT OF ARMATURES OF ELECTRIC MOTORS OR GENERATORS.
(Application filed Aug. 16, 1900.)
(No Model.)

Witnesses:
Wilhelm Vogt
Thomas M. Smith

Inventor:
Joseph T. Watson,
By J. Walter Douglas,
Attorney.

UNITED STATES PATENT OFFICE.

JOSEPH T. WATSON, OF PHILADELPHIA, PENNSYLVANIA, ASSIGNOR OF ONE-FOURTH TO JACOB E. FRITZ, OF CAMDEN, NEW JERSEY.

DEVICE FOR INDICATING DISARRANGEMENT OF ARMATURES OF ELECTRIC MOTORS OR GENERATORS.

SPECIFICATION forming part of Letters Patent No. 666,831, dated January 29, 1901.

Application filed August 16, 1900. Serial No. 27,017. (No model.)

*To all whom it may concern:*

Be it known that I, JOSEPH T. WATSON, a citizen of the United States, residing at the city of Philadelphia, in the county of Philadelphia and State of Pennsylvania, have invented certain new and useful Improvements in Devices for Indicating Disarrangement of the Armatures of Electric Motors or Generators, of which the following is a specification.

My invention has relation to a device for indicating by a telltale or signaling device disarrangement of the armature of an electric motor or generator to prevent in case of sagging or wear of the journal-bearings of the armature the same coming in contact with the pole-pieces or the magnets, which would disorganize the armature by ripping and tearing the wiring of the same.

The principal objects of my invention are, first, to provide a comparatively simple and effective device for indicating by a telltale or signal any disarrangement of the armature of an electric motor or generator through wear of the bearings of the armature to come in contact with the magnets or pole-pieces calculated to rip off the wires of the armature or to compel removal of the armature for rewiring or repairs, and, second, to provide a telltale or signal device in a circuit adapted in case of wear or sagging of the journal-bearings of the armature of an electric motor or generator to indicate such wear and without contact of the armature with the pole-pieces or magnets of the motor or generator.

My invention, stated in general terms, consists of a device for indicating disarrangement of the armature of an electric motor or generator constructed and arranged in substantially the manner hereinafter described and claimed.

The nature, scope, and general characteristic features of my invention will be more fully understood from the following description, taken in connection with the accompanying drawings, forming part thereof, in which—

Figure 1:
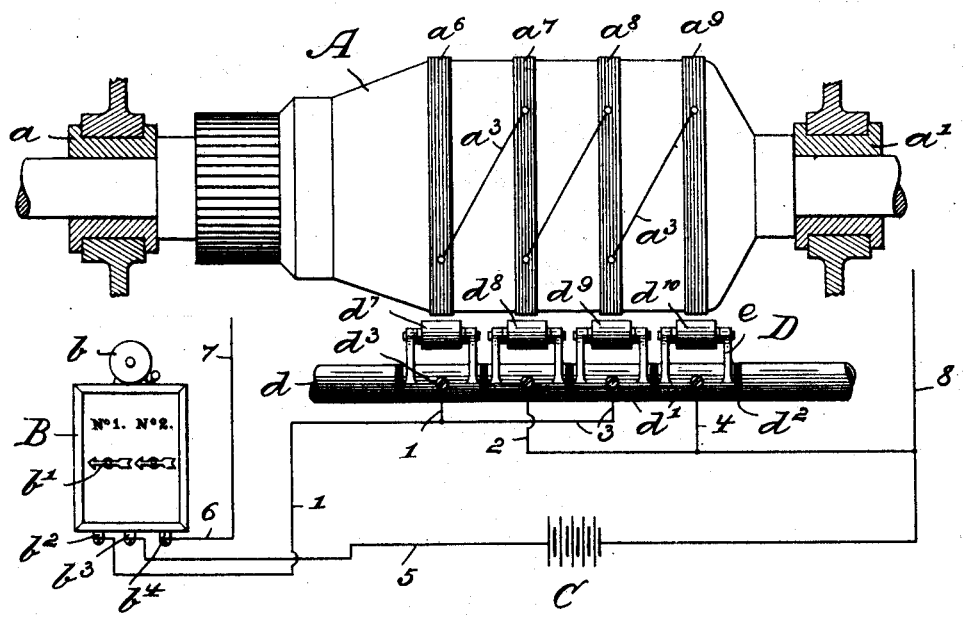
Figure 2:
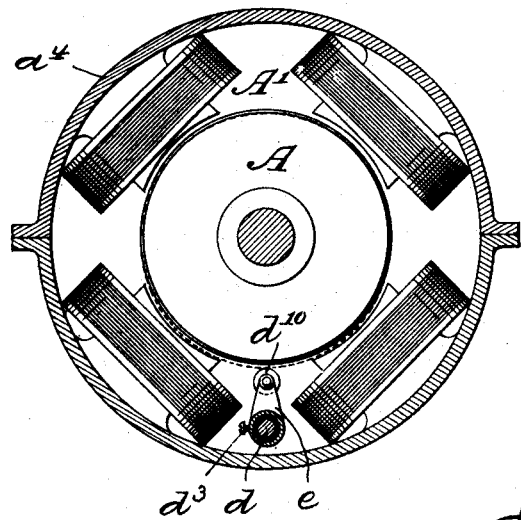

Figure 1 is an elevational view, partly in diagram, of the armature of an electric motor or generator, a signal or telltale in a battery-circuit, and the device of my invention for preventing disarrangement of the armature-windings shown in application about the magnetic field and for preventing the armature proper being brought into contact with the pole-pieces of such field through any sagging of the journals or bearings of the armature by extended use thereof; and Fig. 2 is a view, partly in section and partly in elevation, of the armature with its magnets or pole-pieces arranged adjacent thereto and inclosed within a housing shown in section and also showing between two of the pole-pieces the device of my invention, as hereinbefore defined, adapted in case of any sagging of the bearings of the armature of the latter coming in contact with the device to establish instantly a circuit through the armature and said device or sections thereof with the telltale or signal of Fig. 1.

With respect to my invention it may be here remarked that the same is especially adapted for use in connection with the armatures of motors employed in the operation of trolley-cars; but it is, however, adapted for use in conjunction with motors or generators in electric-power stations.

Hitherto through constant use by heating up of the journals of armatures rapid wear was occasioned and sagging of the armature, thereby causing the same to contact with their pole-pieces, thus ripping the wiring from the armature and not only occasioning loss of time in repairing, but also considerable expense in making such repairs to the armature.

To obviate destruction and rewiring of the armature of a motor is the main feature of my present invention, whereby any undue wear of the journals of the armatures through a telltale is a circuit established which enables the wear to be readily determined and compensated for without either the destruction or disarrangement of the wiring of the armature proper of the generator or motor.

Referring to the drawings, A represents the armature of an electric motor or generator in a longitudinal position, as shown, and provided at each end with bearings $a$ and $a'$ and with protecting-bands $a^6$, $a^7$, $a^8$, and $a^9$, connected with each other by conductors $a^3$, as clearly illustrated in Fig. 1.

B is a signal or telltale device provided with a bell $b$ and with pointers $b'$ and with the numerals "No. 1" and "No. 2" appearing on the face of said device. Beneath the device are located binding-posts $b^2$, $b^3$, and $b^4$.

C is a local battery included in a circuit to and from said signal or telltale B.

D represents the device of my invention, consisting of an internally-insulated tube or shaft $d$, divided into a series of sections $d'$, each insulated from the other at $d^2$ and each section provided with a binding-post $d^3$. Projecting upward from the tube or shaft $d$ are vertical bearings $e$ for the rolls loosely journaled in said bearings. From the respective bindings-posts of the device lines 1, 2, 3, and 4 extend; lines 1 and 3 to the binding-post $b^2$, and lines 2 and 4 to the battery C, line 5 extending from said battery to the binding-post $b^3$. The lines 6 and 7 extend, respectively, from the binding-post $b^4$ to motor No. 2. (Not shown.) The other end of said line extends from line 8 to the other pole of the second motor telltale or signal. When either of the bearings $a$ or $a'$ by constant revolution of the armature within the magnetic field $A'$, inclosed within the casing $a^4$, as clearly illustrated in Fig. 2, should sag or assume an inclination so as to bring two or more of the series of bands $a^6$ and $a^7$ or $a^8$ and $a^9$ into contact with certain of the rolls—for example, $d^7$ and $d^8$ or $d^9$ and $d^{10}$—the circuit will be instantly established from the telltale or signal device B, on the face indicated as "No. 1," from the battery by the lines 1 and 4, through the base of the device D, the bearings or standards $e$, and certain of the rolls thereof, with certain of the bands surrounding the armature A, to thereby establish the circuit in the manner just explained, with the telltale or signal to cause the pointer to indicate at "No. 1" that either one or both sides of said armature has or have sagged and without, through the contact of certain of the rolls of the device with certain of the bands of the armature, affecting the wiring of the latter or of any occasion being presented for removal of the armature for being rewound or wired. It will be observed that it matters not whether the entire series of rolls illustrated in Fig. 1 are brought into contact with the protecting-bands or only certain of them, the armature-windings will not be affected thereby, because the said rolls will maintain through such contact the armature free from its poles in the magnetic field long enough to indicate through said telltale any sagging to be compensated for without the armature necessarily, if overcome by repairing, ever coming in contact with its magnets.

It will be manifestly obvious that as to certain details modifications may be made as to the character and possible arrangement of the device without departing from the spirit and scope of my present invention, and hence I do not wish to be understood as limiting myself to the precise arrangement of the said device for the purposes of the invention as illustrated in the drawings and as hereinbefore explained; but,

Having thus described the nature and objects of my invention, what I claim as new, and desire to secure by Letters Patent, is—

1. In a device of the character described, in combination with a rotating armature and its stationary field-magnets, of a shaft arranged below and in alinement with the axis of the armature, said shaft divided into sections properly insulated from each other, a battery-circuit wherein an indicator or alarm is included, the sections of the shaft being alternately connected with the opposite poles of the battery, and a series of protective bands wound around the armature and electrically connected to each other, said bands being arranged respectively adjacent to the sections of the shaft and adapted when the armature is depressed to connect alternate sections of said shaft to thereby complete the battery-circuit, substantially as and for the purposes described.

2. In a device of the character described, in combination with a rotating armature and its field-magnets, of a shaft arranged below and in alinement with the axis of the armature, said shaft divided into sections insulated from each other, a series of rollers supported above and in electric connection respectively with each section of the shaft, a battery-circuit wherein an indicator or alarm is included, the sections of the shaft and the respective rollers being alternately connected with opposite poles of the battery, and a series of protective bands wound around the armature and electrically connected to each other, said bands being arranged respectively adjacent to the rollers and adapted when the armature is depressed to be supported thereon and to thereby connect alternate sections of the shaft to complete the battery-circuit, substantially as and for the purposes described.

In testimony whereof I have hereunto set my signature in the presence of two subscribing witnesses.

JOS. T. WATSON.

Witnesses:
J. WALTER DOUGLASS,
THOMAS M. SMITH.